(12) United States Patent
Baudou

(10) Patent No.: US 8,297,776 B2
(45) Date of Patent: Oct. 30, 2012

(54) "LIP LIGHT" AUTOMATICALLY CONTROLLED BY THE POSITION OF THE HEAD

(75) Inventor: Joël Baudou, St Medard En Jalles (FR)

(73) Assignee: Thales, Neuilly-sur-Seine (FR)

( * ) Notice: Subject to any disclaimer, the term of this patent is extended or adjusted under 35 U.S.C. 154(b) by 241 days.

(21) Appl. No.: 12/774,252

(22) Filed: May 5, 2010

(65) Prior Publication Data
US 2010/0283412 A1 Nov. 11, 2010

(30) Foreign Application Priority Data

May 5, 2009 (FR) ...................................... 09 02159

(51) Int. Cl.
F21V 21/084 (2006.01)
(52) U.S. Cl. ........ 362/105; 362/276; 362/295; 362/802; 381/367
(58) Field of Classification Search .......... 362/105–106, 362/276, 295, 802; 381/367
See application file for complete search history.

(56) References Cited

U.S. PATENT DOCUMENTS

| 4,347,508 A | 8/1982 | Spooner |
| 5,467,480 A | 11/1995 | Baudou et al. |
| 5,623,730 A | 4/1997 | Baudou et al. |
| 5,742,937 A | 4/1998 | Baudou et al. |
| 6,014,769 A | 1/2000 | Baudou et al. |
| 6,342,872 B1 | 1/2002 | Potin et al. |
| 6,377,401 B1 * | 4/2002 | Bartlett .......................... 359/630 |
| 7,303,303 B1 | 12/2007 | Haynes et al. |
| 2005/0105285 A1 * | 5/2005 | Maden .......................... 362/105 |

FOREIGN PATENT DOCUMENTS

WO 2004/084664 A2 10/2004
* cited by examiner

Primary Examiner — Jason Moon Han
(74) Attorney, Agent, or Firm — Baker & Hostetler LLP

(57) ABSTRACT

A lighting device for helmet comprises a helmet including an arm to which are fixed a microphone and a lamp, called "lip light", lighting with at least one lighting level. The device comprises a head tracking system comprising a computer for measuring and collecting data concerning the attitude of the helmet in motion and its position in space. Lamp activation means are automatically controlled by positions calculated by the computer so that the lip light lights, with one of its lighting levels, when it is oriented in a direction contained within a predefined area.

7 Claims, 3 Drawing Sheets

"LIP LIGHT" AUTOMATICALLY CONTROLLED BY THE POSITION OF THE HEAD

CROSS-REFERENCE TO RELATED APPLICATIONS

This application claims priority to foreign France patent application No. 0902159, filed on May 5, 2009, the disclosure of which is hereby incorporated by reference in its entirety.

FIELD OF THE INVENTION

The present invention relates to the field of piloting helmets or headsets comprising a lamp used to view cockpit equipment, notably in night-time situations. The invention relates to helmets or headsets that have a posture detection system so called a head tracking system.

BACKGROUND OF THE INVENTION

Posture detection systems or head tracking systems are used in aeronautics, notably to detect head posture, for fighter helmets and for military, civilian or para-civilian helicopter helmets. The last-mentioned case of para-civilian applications may involve sea rescue missions for example. They are also used for simulation helmet detection, and this detection can then be combined with an oculometry device, also called eyetracker, to detect the position of the gaze. In the virtual reality and gaming field, there are also numerous applications for these systems.

More generally, in the field of generic posture detection, there are also numerous applications, notably in the medical field for remote operations and instrument control, in the field of position control for servocontrolled machine tools, or remote control, and finally for cinema, in order to reproduce movements in computer-generated images.

Currently, aeroplane and helicopter pilots use a so-called "lip lamp" or "lip light" to read a map or enter information on the keyboard of their mission system. Cockpit lighting devices are generally discrete so as to ensure safety for the aircraft and the pilot, notably in reconnaissance missions for example. In the case of military helicopters flying at very low altitude, night-time stealth is critical and any lighting that might be visible from outside is forbidden.

The lip light is fixed to the arm of the headset microphone, and has a control switch activated by the pilot by means of a slight pressure of the lips and of the tongue. Thus, the pilot can keep his hands on the flight controls.

The power supply for this lamp is generally produced by a battery installed in or on the helmet. Lighter devices exist which have a small accumulator powered by the microphone circuit.

The position of the lamp is adjusted by the pilot at the start of the mission so as to orient the light flux and place the switch close to the lips.

The lamp often comprises one or more LEDs, possibly LEDs of different colours, compatible or not compatible with the light intensifying night vision devices.

The intensity of the lighting can be adjusted by selecting the number of active LEDs or by virtue of a potentiometer. White LEDs give a more natural view of the environment and some are compatible with light-intensifying devices.

Operationally, the pilot operates his lip light when he looks at the interior of the cockpit and must switch it off to look outside with complete stealth.

After a number of "operations" or actions on the lip light switch, the arm of the microphone supporting the lamp is displaced. Said arm can shift slightly with each use.

The pilot therefore often has to readjust it in flight, which constitutes a nuisance and a risk of flight safety.

Moreover, the pilot often has to alternate his gaze between the outside of the cockpit and the interior, and one drawback lies in the large quantity of equipment present in a cockpit, notably multifunction screens, and the adequacy of the lighting for the equipment being viewed.

Given the context in which the pilot is greatly occupied, said pilot does not spontaneously adapt the lighting, for example its intensity, to the equipment that is viewed.

SUMMARY OF THE INVENTION

The invention makes it possible to alleviate the above mentioned drawbacks.

One aim of the invention is to couple the head tracking device with the lip light fixed to the helmet so that, depending on the position of the pilot's head, the lamp is or is not activated automatically. One embodiment of the invention makes it possible to adapt the lighting, for example the intensity or the colour, depending on the equipment being viewed.

Advantageously, the lighting device for a helmet comprises a helmet including an arm to which are fixed a microphone and a lamp, the lamp being called "lip light" and lighting with at least one lighting level. The device comprises a head tracking system comprising a computer for measuring and collecting data concerning the attitude of the helmet in motion and its position in space.

Advantageously, lamp activation means are automatically controlled by information calculated by the computer defining at least one orientation of the helmet so that the lip light lights, with one of its lighting levels, when it is oriented in a direction contained within a predefined area.

Advantageously, the lip light activation means are controlled by a switch that has at least two states, "ON" and "OFF".

Advantageously, the instrument panel of the cockpit is divided into a plurality of areas, each of the areas being contained between a maximum and minimum lateral orientation predefined on the basis of a point and a straight line of the cockpit that are predefined and a maximum and minimum longitudinal orientation predefined on the basis of the predefined point and straight line of the cockpit, each of the areas corresponding to a state of the switch, "ON" or "OFF", the predefined point corresponding to a known position of the helmet and the straight line corresponding to a known orientation of the helmet.

Advantageously, the lip light comprises at least one diode of variable intensity, defining a plurality of lighting levels, controlled by a first potentiometer.

Advantageously, the lip light comprises a plurality of diodes, the number of diodes lit being controlled by a second potentiometer.

Advantageously, the lighting levels of each diode comprise a predefined intensity, corresponding to the number of diodes lit, the number of diodes lit at a given instant, defining a plurality of lighting levels, being controlled by the second potentiometer.

Advantageously, each of the areas of the cockpit corresponds to a predefined lighting level, the first or the second potentiometer being automatically controlled by the orientation of the helmet.

BRIEF DESCRIPTION OF THE DRAWINGS

Further features and benefits of the invention will become apparent from the following description, given in light of the appended drawings, in which.

DETAILED DESCRIPTION

The invention makes it possible to automatically control the lighting of the lip light based on the direction of the gaze by virtue of the head tracking device. In some aeroplanes or helicopters, the head tracking device is incorporated in the helmet sight. A computer notes the positions and the attitudes of the head/helmet of the pilot at regular time intervals.

One benefit of such automatic control of the lamp based on posture detection is notably to automatically switch off the lamp when the pilot is looking outside. When the pilot looks outside the cockpit, the extinguishing of the lights ensures maximum stealth and lightens the pilot's workload.

In one embodiment, the lip light can be activated automatically when the cockpit lighting is in night mode and the pilot is looking at the interior of the cockpit, not at the cockpit window(s).

In this embodiment, the internal surface of the cockpit corresponding to the instrument panel defines a first area and the space formed by at least one window for looking outside the cockpit defines a second area.

The setpoint is defined by the angular orientation of the helmet and the angles corresponding to the contours of the cockpit.

Figure 1:
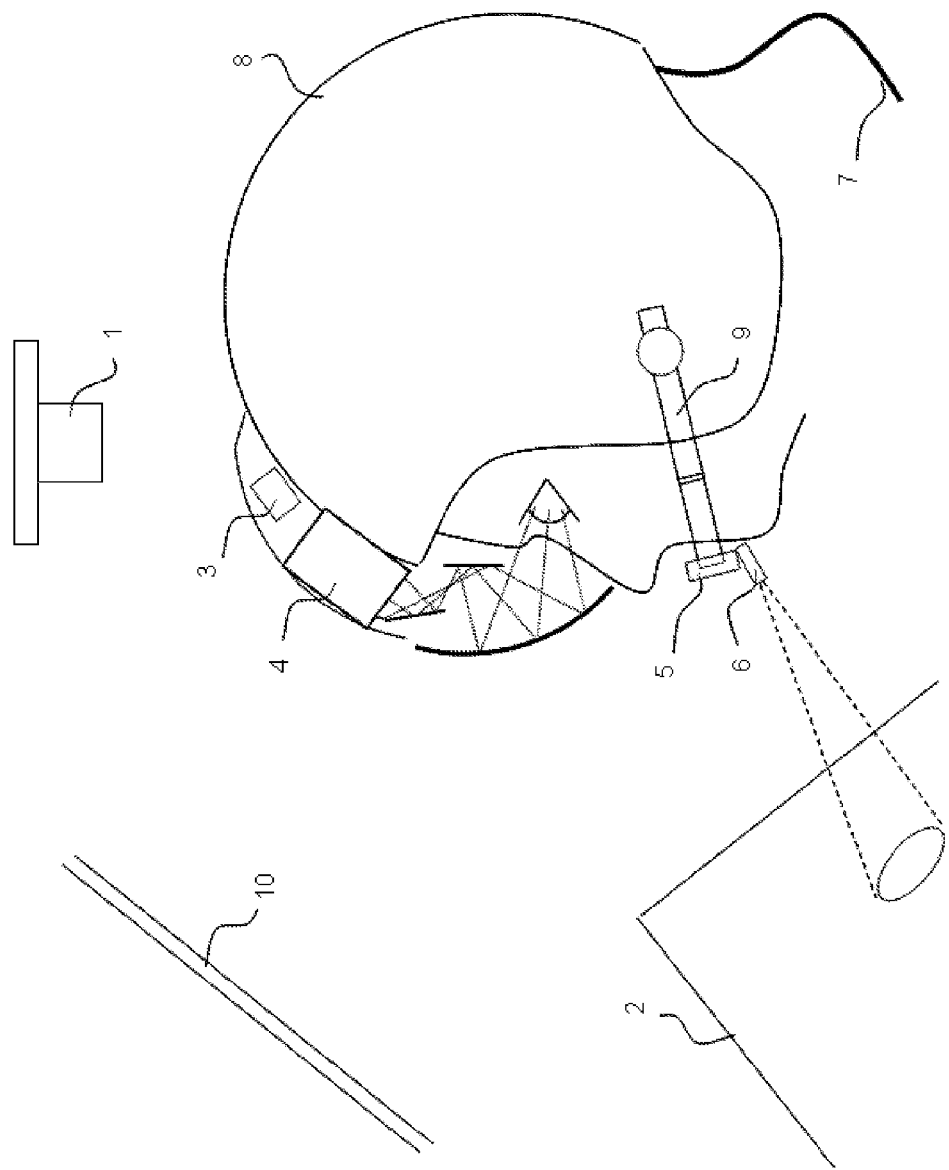
FIG. 1 represents a lighting device of a pilot's helmet, the helmet comprising a motion detection device.

FIG. 1 represents a pilot wearing a helmet 8 represented in a cockpit comprising an instrument panel 2 and a window 10. A head tracking detection device 1, 3 comprises a head tracking emitter/receiver 1 positioned in the cockpit and a head tracking emitter/sensor 3 secured to the helmet 8.

According to the embodiments, the head tracking device comprises a fixed portion installed in the cockpit which either projects images or radiates a field, or detects light or field variations. According to the device fixed to the cockpit, the helmet comprises either sensors or emitters such as diodes.

The invention is compatible with all the variants of head tracking devices given that a computer is used to measure and collect the positions and the attitudes of the helmet in the cockpit.

FIG. 1 also represents a helmet sight comprising an image source and a relay optic 4 which is automatically controlled by the computer of the head tracking device. A power supply cable 7 is used notably to power the helmet sight.

The projection of images superimposed on the helmet visor provides the pilot with navigation assistance when he looks through the window 10.

In a preferred embodiment, the helmet according to the invention is provided with a microphone 5 positioned at the end of an arm 9 fixed to one side of the helmet and enabling the microphone 5 to be positioned in front of the pilot's mouth.

Advantageously, a lip light 6 is placed at the end of the arm under the microphone and provides lighting in a cone of predetermined radius and at a predetermined intensity.

In one embodiment, the lip light can light differently depending on the direction of the instrument panel toward which the lamp is pointing.

Figure 2:
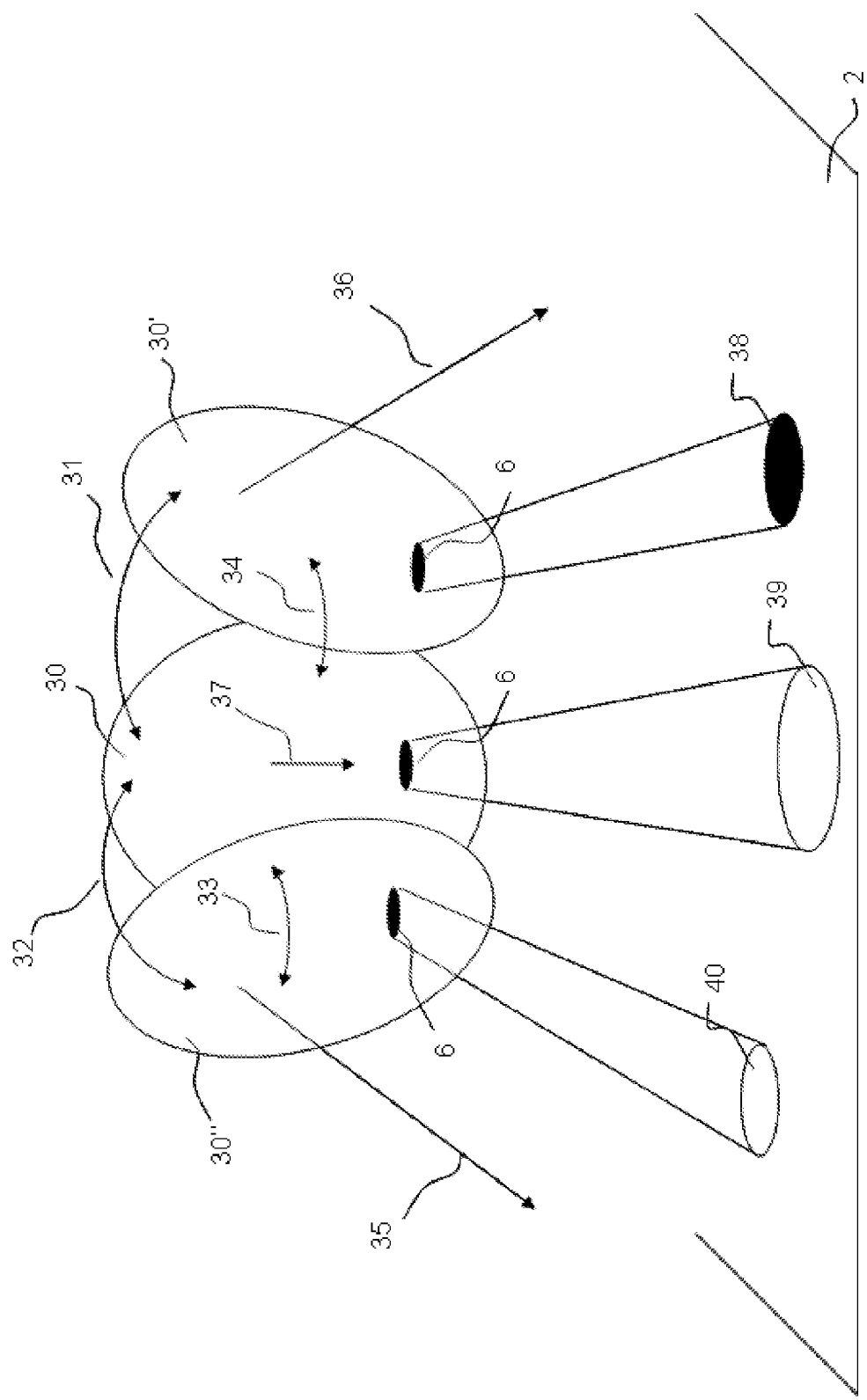
FIG. 2 represents different lighting modes depending on the posture of the head.

FIG. 2 represents an embodiment example in which the helmet and the head are alternately in postures 30, 30' and 30". The posture is determined relative to a predetermined initial position. From this initial position, the pilot makes a movement of the head in all the degrees of freedom that are available to him. The helmet is then in motion 33, 34, 31, 32 and, at a given instant, the pilot is "frozen" in a given posture.

The movements of the solid in the cockpit, the solid being defined by the helmet, define, at each instant, a direction 35, 37, 36, said direction making it possible to know the orientation of the gaze of the pilot looking inside the cockpit.

The direction of the helmet is calibrated at an instant in a direction that defines a reference head posture. Each movement of the head and therefore of the helmet relative to this reference posture defines an orientation deviation which makes it possible to know the direction of the gaze of the pilot.

It is possible to define areas of the cockpit according to the deviation between the orientation of the reference posture and a maximum lateral and longitudinal orientation of the head.

The invention makes it possible to adjust the size of the lighting cone 38, 39, 40 and the light intensity according to the area to which it points.

The invention makes it possible to define areas of the cockpit in which it is possible to adapt the lighting of the lip light 6.

Thus, advantageously, the invention makes it possible to adapt the intensity of the lighting and the lit area according to the equipment or the screen viewed by the pilot.

The lip light power supply is, in a preferred embodiment, advantageously derived from that of the helmet sight in order to eliminate the battery and lighten the weight borne by the head.

Another benefit of lamp control based on posture detection is that the arm of the microphone no longer risks being shifted in flight.

Figure 3:
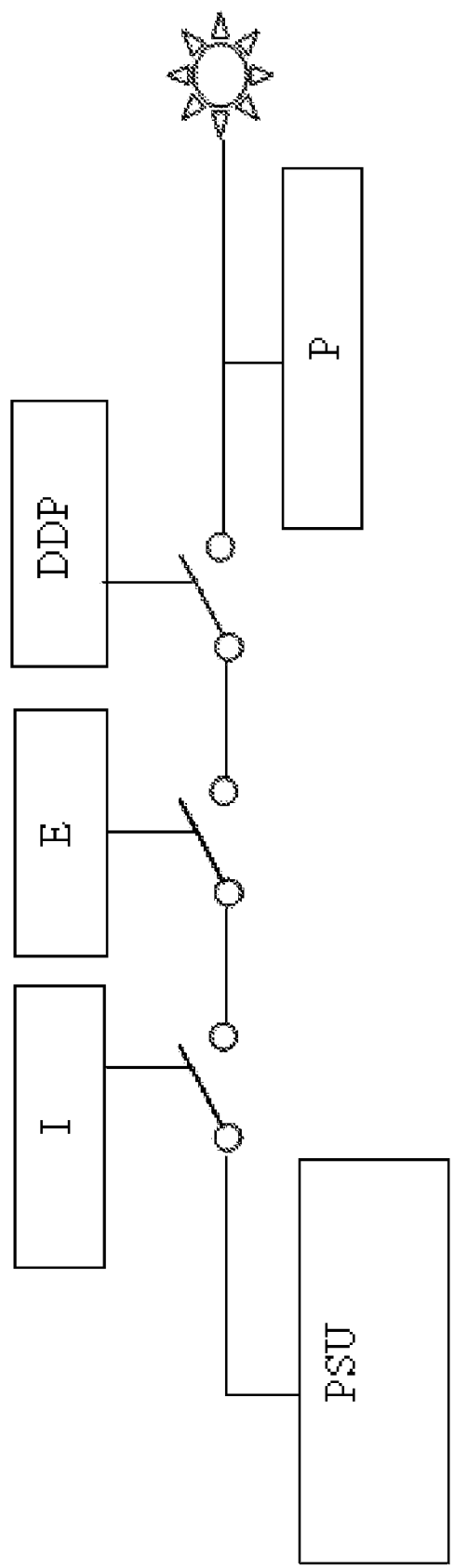
FIG. 3 represents a scheme of the various functions of the lighting device according to the invention.

FIG. 3 represents the coupling between the potentiometer P of the lamp and the posture detection, denoted DDP, of the helmet. Moreover, depending on whether the cockpit is in "night" mode or "day" mode, the lighting E of the cockpit is or is not activated. The general switch I can be used to deactivate the equipment used to assist the pilot in "night" mode, notably the power supply unit PSU, dedicated to the lip light which can be activated or not activated depending on the current cockpit mode.

In a variant embodiment, the lip light comprises a plurality of diodes which make it possible to vary the light intensity of the mouth lamp.

In a first embodiment, the diodes have an identical intensity, the light intensity level being determined by the number of diodes lit. The number of diodes lighting up being automatically controlled by the orientation of the helmet and the area that the direction points to.

In another embodiment, the diodes have a variable intensity that is not necessarily identical. In this case, for example, all the diodes are lit but the light intensity level of each of them can be adjusted, for example, by means of a second potentiometer that has a number of outputs, the second potentiometer being automatically controlled by the orientation of the headset. Advantageously, the number of diodes lit depends on the orientation of the helmet and the area to which it points.

What is claimed is:

1. A lighting device for a helmet comprising:
   a helmet including an arm to which are fixed a microphone and a lamp, the lamp lighting with at least one lighting level;
   a head tracking system comprising a computer for measuring and collecting data concerning an attitude of the helmet in motion and a position of the helmet in space; and
   lamp activation means, the lamp activation means being automatically controlled by information calculated by the computer defining at least one orientation of the helmet so that the lamp lights to the at least one lighting level, when the helmet is oriented in a direction contained within a predefined area.

2. The lighting device for a helmet according to claim 1, wherein the lamp activation means are controlled by a switch that has at least two states, "ON" and "OFF".

3. The lighting device for a helmet according to claim 2, wherein the "ON" or "OFF" state of the switch is defined for each area of a plurality of areas dividing an instrument panel of a cockpit, each of the areas being contained between a maximum and minimum lateral orientation predefined based on a point and a straight line of the cockpit that are predefined and a maximum and minimum longitudinal orientation predefined based on the predefined point and straight line of the cockpit, the predefined point corresponding to a known position of the helmet and the straight line corresponding to a known orientation of the helmet.

4. The lighting device for a helmet according to claim 3, wherein the lamp comprises at least one diode of variable intensity, defining a plurality of lighting levels, controlled by a first potentiometer.

5. The lighting device for a helmet according to claim 4, wherein the lamp comprises a plurality of diodes, the number of diodes lit being controlled by a second potentiometer.

6. The lighting device for a helmet according to claim 5, wherein lighting levels of each diode comprise a predefined intensity corresponding to the number of diodes lit, the number of diodes lit at a given instant, defining a plurality of lighting levels, being controlled by the second potentiometer.

7. The lighting device for a helmet according to claim 6, wherein each of the areas of the cockpit corresponds to a predefined lighting level, the first or the second potentiometer being automatically controlled by the orientation of the helmet.

* * * * *